(12) United States Patent
Hemetzberger et al.

(10) Patent No.: US 12,519,154 B2
(45) Date of Patent: Jan. 6, 2026

(54) BATTERY FOR A MOTOR VEHICLE

(71) Applicant: Dr. Ing. h.c. F. Porsche Aktiengesellschaft, Stuttgart (DE)

(72) Inventors: Sebastian Hemetzberger, Ostfildern (DE); Oliver Heeg, Schwieberdingen (DE); Rüdiger Klutinus, Pforzheim (DE); Michael Englmeier, Lenting (DE); Christian Wendland, Grafenau (DE); Nils Habedank, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 790 days.

(21) Appl. No.: 17/833,984

(22) Filed: Jun. 7, 2022

(65) Prior Publication Data

US 2022/0407140 A1 Dec. 22, 2022

(30) Foreign Application Priority Data

Jun. 17, 2021 (DE) ...................... 10 2021 115 705.6

(51) Int. Cl.
*H01M 10/653* (2014.01)
*B60L 50/64* (2019.01)
(Continued)

(52) U.S. Cl.
CPC ........... *H01M 10/653* (2015.04); *B60L 50/64* (2019.02); *H01M 50/211* (2021.01);
(Continued)

(58) Field of Classification Search
CPC ....... B60K 6/28; B60L 50/64; B60Y 2200/91; B60Y 2200/92; B60Y 2400/112;
(Continued)

(56) References Cited

U.S. PATENT DOCUMENTS 7,749,643 B2 * 7/2010 Tsai ..................... H01M 50/519
429/96
7,777,161 B2 * 8/2010 Zeyen ................... F24H 9/1872
219/520

(Continued)

FOREIGN PATENT DOCUMENTS

CN 109411667 A 3/2019
CN 109830467 A * 5/2019
(Continued)

OTHER PUBLICATIONS

Guillon O. Ceramic materials for energy conversion and storage: A perspective. Int J Ceramic Eng Sci. 2021; 3: 100-104. https://doi.org/10.1002/ces2.10086 Pag 101, par 1 (Year: 2021).*

(Continued)

*Primary Examiner* — Nicole M. Buie-Hatcher
*Assistant Examiner* — Gilberto Ramos Rivera
(74) *Attorney, Agent, or Firm* — Buchanan Ingersoll & Rooney PC

(57) ABSTRACT

A battery for a motor vehicle has a battery housing including at least one busbar and at least two battery cells arranged in the housing and held by a holder. The busbar electrically conductively connects connection points of at least two of the battery cells. In order to achieve an increased power, heat-conducting paths for cooling are provided by virtue of the busbar and/or the holder being thermally conductively connected to the battery housing by a thermal adhesive.

14 Claims, 2 Drawing Sheets

(51) Int. Cl.
  *H01M 50/211* (2021.01)
  *H01M 50/249* (2021.01)
  *H01M 50/502* (2021.01)
  *B60K 6/28* (2007.10)

(52) U.S. Cl.
  CPC ....... *H01M 50/249* (2021.01); *H01M 50/502* (2021.01); *B60K 6/28* (2013.01); *B60Y 2200/91* (2013.01); *B60Y 2200/92* (2013.01); *B60Y 2400/112* (2013.01); *H01M 2220/20* (2013.01)

(58) Field of Classification Search
  CPC ............. H01M 10/613; H01M 10/625; H01M 10/653; H01M 10/6553; H01M 2220/20; H01M 50/204; H01M 50/211; H01M 50/249; H01M 50/502; H01M 50/507; H01M 50/514; H01M 50/521
  USPC ............................................ 307/150; 429/99
  See application file for complete search history.

(56) References Cited

U.S. PATENT DOCUMENTS

| | | | |
|---|---|---|---|
| 10,910,685 B2 | 2/2021 | Schwarzer et al. | |
| 2012/0308875 A1* | 12/2012 | Geshi | H01M 50/579 429/159 |
| 2016/0301046 A1* | 10/2016 | Tyler | C09J 163/00 |
| 2019/0074557 A1* | 3/2019 | Shin | H01M 10/6553 |
| 2019/0245433 A1* | 8/2019 | Yan | H05K 7/1427 |
| 2019/0363057 A1* | 11/2019 | Santos Rodriguez | H01L 23/16 |
| 2020/0161606 A1* | 5/2020 | Yu | H01M 50/233 |
| 2020/0169069 A1 | 5/2020 | Hiramitsu et al. | |

FOREIGN PATENT DOCUMENTS

| | | | | |
|---|---|---|---|---|
| CN | 110505325 A | * | 11/2019 | ............. B32B 9/005 |
| CN | 110556607 A | | 12/2019 | |
| CN | 209948006 U | | 1/2020 | |
| CN | 210443644 U | | 5/2020 | |
| CN | 211182334 U | | 8/2020 | |
| DE | 102014001975 A1 | * | 8/2015 | .......... H01M 10/625 |
| DE | 102015002828 A1 | * | 9/2016 | .......... H01M 10/613 |
| DE | 102016203129 B3 | * | 5/2017 | |
| DE | 102016208053 A1 | | 11/2017 | |
| DE | 102017129249 A1 | | 6/2019 | |
| JP | 2022002199 A | * | 1/2022 | |
| KR | 20190091631 A | * | 8/2019 | .............. H01M 1/10 |
| WO | WO-2019054798 A1 | * | 3/2019 | ............ H01M 10/42 |
| WO | WO-2020043384 A1 | * | 3/2020 | .......... H01M 10/425 |

OTHER PUBLICATIONS

Machine translation of DE 102016203129 B3, retrieved Feb. 2025 (Year: 2025).*
Machine translation of DE 102015002828 A1, retrieved Feb. 2025 (Year: 2025).*
Machine translation of JP 2022002199 A, retrieved Feb. 2025 (Year: 2025).*
Machine translation of CN 109830467 A, retrieved Feb. 2025 (Year: 2025).*
Machine translation of DE 102014001975 A1, retrieved Feb. 2025 (Year: 2025).*
Machine translation of WO 2019054798 A1, retrieved Feb. 2025 (Year: 2025).*
Bellosi, A., et al. "Fast densification of ultra-high-temperature ceramics by spark plasma sintering." International Journal of Applied Ceramic Technology 3.1 (2006): 32-40. Pag. 32; par. 1 (Year: 2006).*
Belmonte, M. "Advanced ceramic materials for high temperature applications." Advanced engineering materials 8.8 (2006): 693-703. Pag. 693; par. 1 (Year: 2006).*
CN110505325A—Machine translation retrieved on May 2025 (Year: 2025).*
WO2020043384A1—Machine translation, retrieved on May 2025 (Year: 2025).*
KR20190091631A—Machine translation retrieved on May 2025 (Year: 2025).*

* cited by examiner

BATTERY FOR A MOTOR VEHICLE

CROSS-REFERENCE TO RELATED APPLICATION

This application claims priority to German Patent Application No. 10 2021 115 705.6, filed Jun. 17, 2021, the content of such application being incorporated by reference herein in its entirety.

FIELD OF THE INVENTION

The present invention relates to a motor vehicle having a battery housing having at least two battery cells arranged therein and held by means of a holder. The invention furthermore relates to an electric or hybrid vehicle having a battery of this kind.

BACKGROUND OF THE INVENTION

DE 10 2014 001 975 A1, which is incorporated by reference herein, discloses a generic battery for a motor vehicle having a plurality of battery cells and at least one busbar, which electrically conductively connects connection points of at least two battery cells. A temperature-control element consisting of an electrically insulating material is secured to the busbar, said temperature-control element defining at least one cavity intended to convey a temperature-control medium, which cavity is closed apart from an inflow opening and an outflow opening and extends along the busbar. This is intended to be used to achieve active fluid cooling of the busbars and thus improved cooling of the battery.

DE 10 2017 129 249 A1, which is incorporated by reference herein, discloses a cooling device having a heatsink for a heat source for a vehicle, said heat source being arranged on said heatsink and requiring cooling, wherein a thermally conductive graphite strip is arranged between the heatsink and the heat source in order to establish thermal contact between the heat source and heatsink of the cooling device.

CN 109411667 A, CN 110556607 A, CN 209948006 and CN 210443644 U and CN 211182334 U, which are each incorporated by reference herein, disclose further batteries. US 2020/169069 A1, which is incorporated by reference herein, discloses a busbar module having a busbar formed from a planar piece of metal. Also provided is a heat-conducting plate, which is in contact with the surroundings of the busbar and extends from said busbar outward.

SUMMARY OF THE INVENTION

In order to be able to achieve the highest possible performance of a battery, in particular a motor vehicle battery, it may be important to control the temperature of said battery, that is say to cool said battery, in particular at a high power output. To this end, there are a wide range of options, wherein in particular fluid cooling systems, however, have a comparatively complex design outlay and are therefore expensive.

The present invention therefore deals with the problem of specifying an improved or at least an alternative embodiment for a battery of the generic type that permits in particular improved cooling in a cost-effective manner and with a simple design.

The present invention relates to the concept of providing further cooling options which are cost-effective and have a simple design for a battery for a motor vehicle, by virtue of cooling busbars and/or holders, which are subjected to high temperature loads, for individual battery cells for example at a high power output. The battery according to aspects of the invention for a motor vehicle has a battery housing having at least two battery cells arranged therein and held by means of the holder and also has at least one busbar, which electrically conductively connects connection points of the at least two battery cells. According to aspects of the invention, the busbar and/or the holder is/are now thermally conductively connected to the battery housing by means of a thermal adhesive. The heat-transmitting connection can be made here directly or indirectly. Due to the fact that the busbar, which heats up intensely in particular at a high power output, and/or the holder for holding the individual battery cells is/are connected in a heat-transmitting manner to the battery housing, additional cooling of the holders or the busbars and thus an overall improved cooling of the battery can be achieved without modifications with a complex design, such as for example the provision of channels that convey cooling fluid, being necessary for this. Furthermore, it is greatly advantageous that the temporarily comparatively high temperatures that arise at the busbars can be dissipated directly and thus do not additionally contribute to heating of the battery. A dissipation of heat via the holders as well is particularly advantageous because there is usually a flat contact between the individual battery cells and the holder that makes optimized heat transmission possible. Through the local cooling of the busbars or the holders, it is additionally possible to individually influence what are known as thermal hotspots of the battery, wherein, for example, regions of the battery cells that are subjected to high temperatures are connected to the battery housing over a larger area via the holder so that a greater cooling effect results in this region. In regions that are not heated as intensely, direct contact between the battery cell and the holder can also be interrupted, for example through corresponding cut-outs, as a result of which location-specific, individual cooling in the interior of the battery is made possible. This enables significantly improved temperature management within the battery housing. A high dissipation of heat is also possible via the comparatively extensive battery housing because the battery housing is usually connected to a cooling device of a motor vehicle, for example an electric or hybrid vehicle.

In one advantageous development of the solution according to aspects of the invention, a first ceramic element is arranged between the battery housing and the busbar. A ceramic element of this type affords the great advantage that on the one hand it is electrically insulating and on the other hand nevertheless has a comparatively high thermal conductivity and as a result enables both electrical insulation and heat transmission. In addition, ceramic is also extremely resistant to temperature, such that even high temperatures arising during operation of the battery are not critical.

By way of example, a synthetic resin based on epoxy resin, which is enriched with ceramic or mineral fillers, is expediently used as thermal adhesive. Although metallic fillers would produce a better thermal conductivity, they would also produce electrical conductivity, which is not desired in the present case. Furthermore, thermal adhesives afford the large advantage that they can be used not only in a thermally conductive manner and therefore for cooling purposes but they also make it possible to fix the busbars or holders to the battery housing.

A second ceramic element is expediently arranged between the battery housing and the holder. A second ceramic element of this kind provides electrical insulation between the holder and the battery housing, but still makes a high dissipation of heat possible.

In a further advantageous embodiment of the solution according to aspects of the invention, the second ceramic element is arranged in a cut-out on the holder. As a result thereof, it is possible to pre-position the second ceramic element relative to the holder, wherein a plastic frame can additionally also be provided for this pre-positioning, said plastic frame being arranged between the second ceramic element and the holder. The plastic frame can therefore be arranged in the cut-out of the holder, wherein said plastic has a comparatively high thermal conductivity for example due to heat-conducting particles. By means of the thermal adhesive, heat that arises during operation of the battery is therefore dissipated from the holder to the battery housing by means of the thermal adhesive and the plastic frame and also by means of the second ceramic element and again thermal adhesive. This enables cooling of the holders to be achieved as well.

In an advantageous development of the solution according to aspects of the invention, the second ceramic element is arranged in the plastic frame such that it is embedded in thermal adhesive. In this case, for example, the plastic frame and the plastic element that is embedded in the thermal adhesive can be formed as a pre-manufactured assembly, which only has to be inserted into a corresponding cut-out on the holder, for example likewise adhesively bonded for a thermal adhesive, and subsequently connected to the battery housing by means of thermal adhesive. As a result, said assembly can be pre-manufactured, as a result of which production processes can be streamlined.

In a further advantageous embodiment of the solution according to aspects of the invention, the busbar is extended up to the battery housing and connected thereto in a heat-transmitting manner by means of the thermal adhesive. A simple extension of the busbar in this case constitutes a comparatively simple embodiment in order to realize a heat-conducting path from the respective battery cell to the battery housing. Busbars of this kind are usually formed from metal and as a result have a particularly good thermal conductivity.

The present invention is also based on the general concept of providing an electric or hybrid vehicle with a battery as described in the previous paragraphs and as a result applying the advantages of battery cooling that is extremely simple in design, but still effective, to the electric or hybrid vehicle. In particular, through optimized cooling of the battery, operation thereof in an optimum temperature window is possible, as a result of which the power of the battery and thus of the electric or hybrid vehicle can be increased.

It is self-evident that the features mentioned above and the features yet to be discussed below may be used not only in the respectively specified combination but also in other combinations or individually without departing from the scope of the present invention.

BRIEF DESCRIPTION OF THE DRAWINGS

Preferred exemplary embodiments of the invention are illustrated in the drawings and will be discussed in more detail in the following description, wherein identical or similar or functionally identical components are denoted by the same reference designations.

In the drawings, in each case schematically.

DETAILED DESCRIPTION OF THE INVENTION

Figure 1:
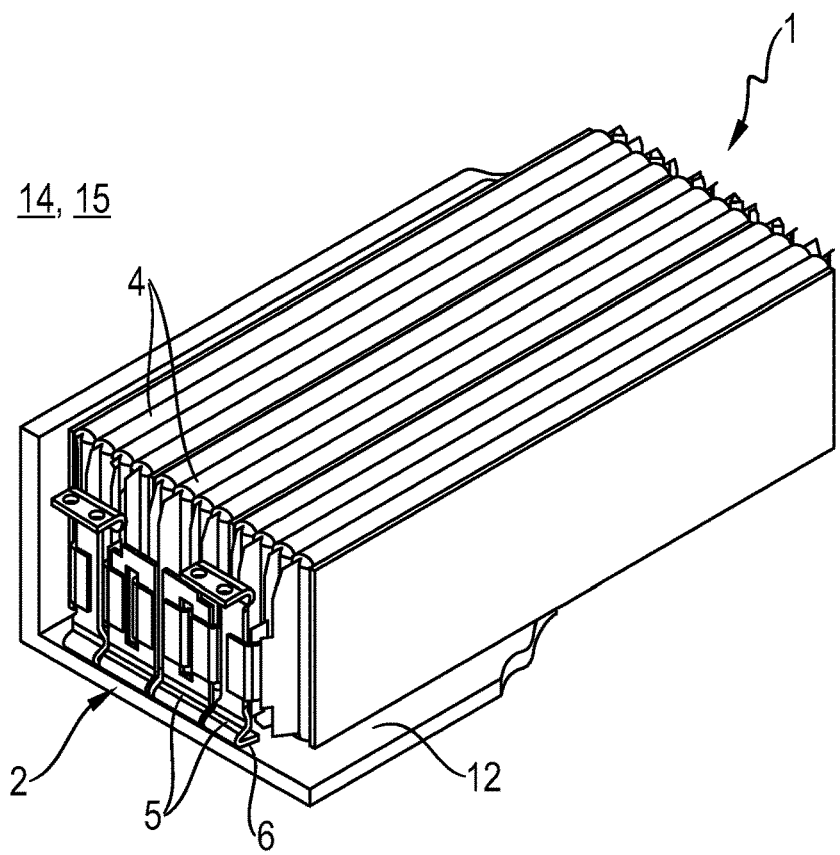
FIG. 1 shows a side view of a battery according to aspects of the invention for a motor vehicle having a battery housing that is only partly illustrated.
Figure 2:
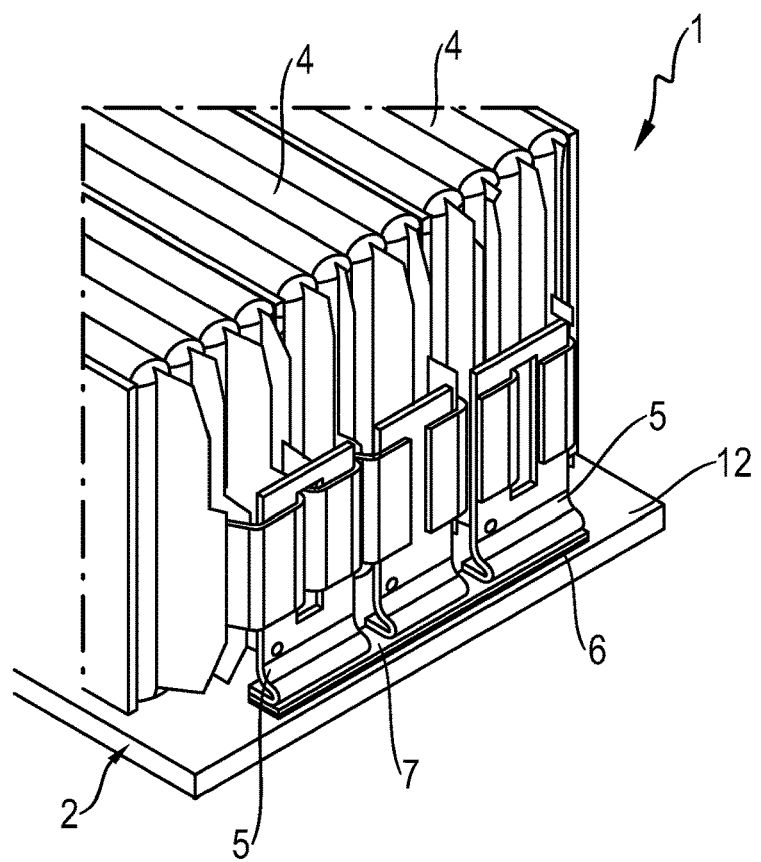
FIG. 2 shows a detailed illustration of the battery according to aspects of the invention in comparison with extended busbars.
Figure 3:
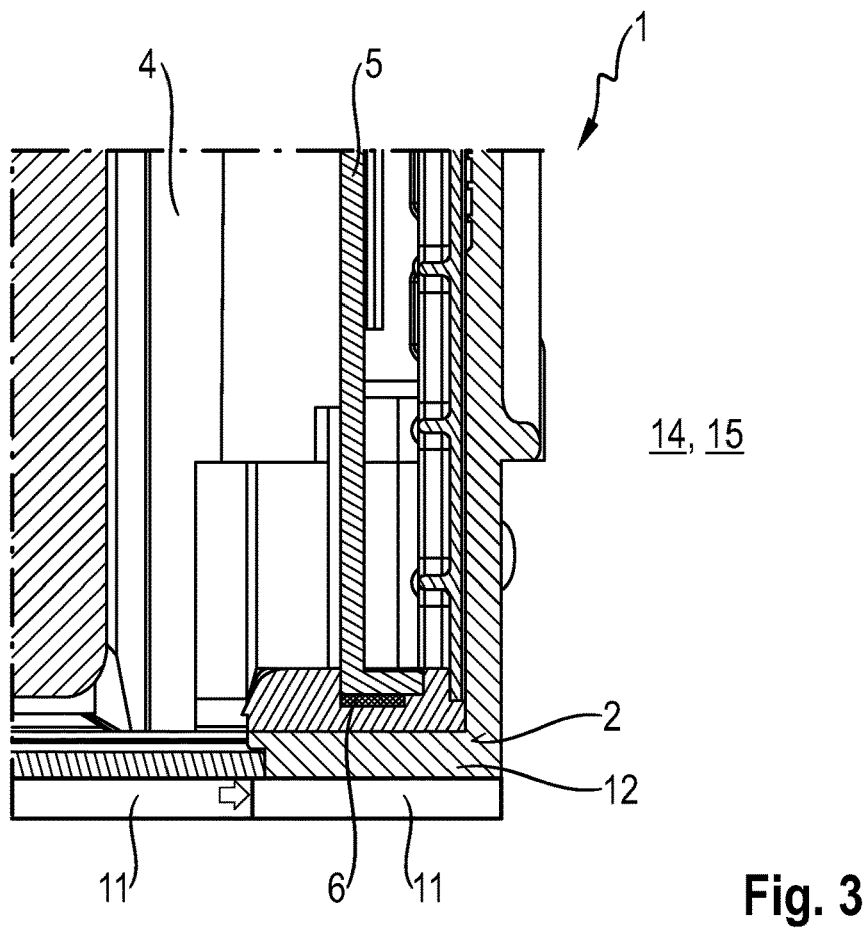
FIG. 3 shows a sectional view through the battery according to aspects of the invention.
Figure 4:
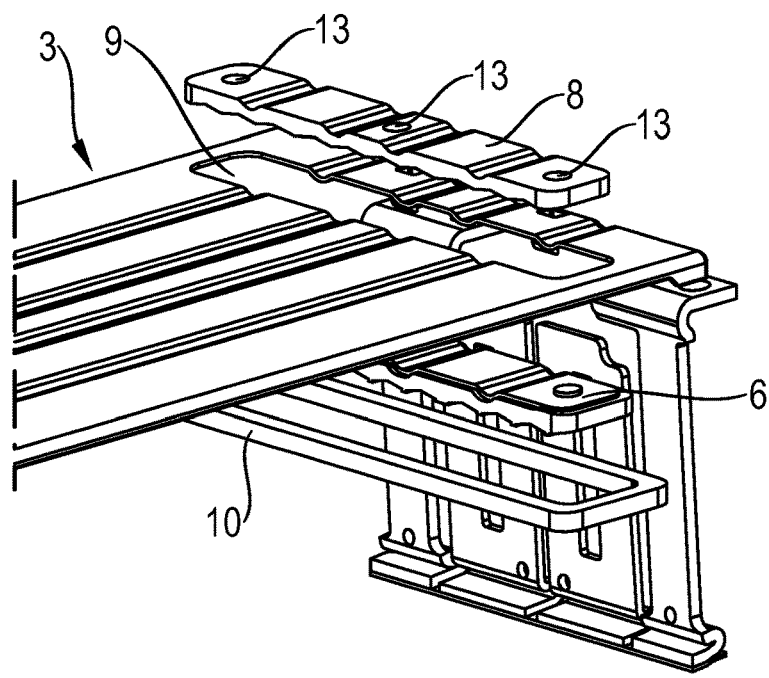
FIG. 4 shows a possible embodiment of a holder of the battery according to aspects of the invention.

According to FIGS. 1-3, a battery 1 according to aspects of the invention for a motor vehicle has a battery housing 2 having at least two battery cells 4 arranged therein and held by means of a holder 3 (cf. FIG. 4). Furthermore, at least one busbar 5, which electrically conductively connects connection points of at least two of the battery cells 4, is provided.

According to aspects of the invention, in order to be able to now achieve an increased power of the battery 1, the busbar 5 and/or the holder 3 is/are connected to the battery housing 2 in a thermally conductive and thus heat-transmitting manner by means of a thermal adhesive 6, that is to say a thermally conductive adhesive. As a result, it is possible to dissipate high temperatures occurring in particular at such busbars 5 to the battery housing 2 and thereby to cool the individual battery cells 4 in the region of the busbars 5 thereof at least locally. The cooling can support operation of the battery cells 4 and thus the battery 1 in an optimum temperature window, which has a particularly advantageous effect on the performance of the battery 1.

In this case, it is conceivable for the busbars 5 to be connected directly to the battery housing 2 by means of the thermal adhesive 6 (cf. FIG. 3) or by means of a first ceramic element 7 arranged between the busbars 6 and the battery housing 2 (cf. FIG. 2). A first ceramic element 7 of this kind in this case affords the advantage of being electrically non-conductive but being resistant to temperature and thermally conductive, as a result of which both electrical insulation in the direction of the battery housing 2 as well as heat transmission are possible. A connection surface to the battery housing 2 and thus a possible dissipation of heat can also be increased by means of a first ceramic element 7 of this kind.

In the same way, the holder 3 can also be connected in a heat-conducting manner to the battery housing 2 either directly by means of the thermal adhesive 6 or by means of a second ceramic element 8 (cf. FIG. 4). The second ceramic element 8 can in this case be arranged or embedded for example in a cut-out 9 on the holder 3.

As a result thereof, it is also possible to secure the second ceramic element 8 on the holder 3 in a form-fitting manner. Furthermore, a plastic frame 10 (cf. FIG. 4) can also be arranged between the second ceramic element 8 and the holder 3, said plastic frame being enriched for example by means of mineral particles in order to increase the thermal conductivity on the one hand but on the other hand to ensure electrical insulation. In this case, the second ceramic element 8 can be arranged or embedded in the plastic frame 10 by means of the thermal adhesive 6. To introduce the thermal adhesive 6, filling openings 13, by means of which the thermal adhesive 6 is injected, can be provided in the ceramic element 8. In this case, the plastic frame 10 helps at least to limit the spread of the thermal adhesive 6, in particular the uncontrolled spread thereof.

Looking at FIG. 3, it can be seen that cooling channels 11 for a coolant are arranged below the battery housing 2, as a result of which a base 12 of the battery housing 2 can be actively cooled. Through a base 12 that is actively cooled in this manner, it is possible to also cool busbars 5 that are thermally connected to said base and the battery cells 4 as well via said busbars, since they are usually made of metal. In order to reach the base 12 of the battery housing 2, the busbars 5 can be extended in the direction of the base 12.

The battery 1 according to aspects of the invention can be used for example in an electric vehicle 14 or a hybrid vehicle 15, as a result of which the range thereof can be increased.

The battery 1 according to aspects of the invention can be used to implement further heat-conducting paths into the battery 1 and as a result achieve improved cooling thereof, at least locally. In this case, in particular regions subjected to high thermal loading, such as for example the busbars 5, are cooled, as a result of which these radiate less heat into the interior of the battery housing 2 and thereby also contribute less intensely to heating of the battery 1. Since both the connection of the busbars 5 to the battery housing 2 by means of the thermal adhesive 6 and also the thermal connection of the holder 3 to the battery housing 2 are less complex in design, the cooling effect that is additionally achieved can be achieved by means of a simple design and in a cost-effective manner.

What is claimed is:

1. A battery for a motor vehicle, said battery comprising:
   a battery housing;
   at least two battery cells arranged in the battery housing;
   a horizontally oriented holder that is positioned over a top side of the battery cells and holds the battery cells in the battery housing; and
   at least one vertically oriented busbar that electrically conductively connects connection points of at least two of said battery cells, wherein the busbar is positioned on a side surface of the battery cells,
   wherein the busbar is thermally conductively connected to the battery housing by a first electrically insulating and thermally conductive element and a thermal adhesive, and
   wherein the holder is thermally conductively connected to the battery housing by a second electrically insulating and thermally conductive element,
   wherein the second element is positioned within a cut-out defined in the holder.

2. The battery as claimed in claim 1, wherein the first element is first ceramic element arranged between the battery housing and the busbar.

3. The battery as claimed in claim 2 wherein the second element is a second ceramic element arranged between the battery housing and the holder.

4. The battery as claimed in claim 3, further comprising a plastic frame arranged between the second ceramic element and the holder.

5. The battery as claimed in claim 4, wherein the second ceramic element is arranged in the plastic frame and embedded in the thermal adhesive.

6. The battery as claimed in claim 3, wherein the second ceramic element comprises filling openings for receiving the thermal adhesive.

7. The battery as claimed in claim 1, wherein the busbar extends up to the battery housing and connects thereto in a heat-transmitting manner by way of the thermal adhesive.

8. The battery as claimed in claim 1, wherein the thermal adhesive comprises a synthetic epoxy resin having ceramic or mineral fillers.

9. An electric or hybrid vehicle comprising the battery as claimed in claim 1.

10. The battery as claimed in claim 1, wherein the busbar and the holder are thermally conductively connected to the battery housing by the thermal adhesive.

11. The battery as claimed in claim 10, wherein the busbar is thermally conductively connected to the battery housing by the thermal adhesive that is disposed between the busbar and the battery housing, and the holder is thermally conductively connected to the battery housing by the thermal adhesive that is disposed between the holder and the battery housing.

12. The battery as claimed in claim 10, wherein the busbar is thermally conductively connected to the battery housing by the thermal adhesive that is disposed between the busbar and the battery housing.

13. The battery as claimed in claim 1, wherein the busbars are positioned against a bottom side surface of the housing in which a cooling channel is disposed.

14. A battery for a motor vehicle, said battery comprising:
   a battery housing;
   at least two battery cells arranged in the battery housing;
   a holder that holds the battery cells in the battery housing; and
   at least one busbar that electrically conductively connects connection points of at least two of said battery cells,
   wherein the busbar and/or the holder is/are thermally conductively connected to the battery housing by a thermal adhesive,
   wherein the holder includes a cutout in which a thermally conductive and electronically non-conductive element is positioned, wherein the element includes openings through which the thermal adhesive can be delivered, and wherein a hollow, thermally conductive and electronically non-conductive frame is positioned about a perimeter of the element to limit uncontrolled spread of thermal adhesive beyond the frame.

* * * * *